United States Patent
Rajaram et al.

(10) Patent No.: US 10,636,160 B1
(45) Date of Patent: Apr. 28, 2020

(54) SYMMETRY EXPLOITATION FOR OBJECT DETECTION IN IMAGES

(71) Applicant: QUALCOMM Incorporated, San Diego, CA (US)

(72) Inventors: Rakesh Nattoji Rajaram, San Diego, CA (US); Sujith Srinivasan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/150,956

(22) Filed: Oct. 3, 2018

(51) Int. Cl.
| | |
|---|---|
| *G06T 7/68* | (2017.01) |
| *G06K 9/62* | (2006.01) |
| *G06K 9/46* | (2006.01) |
| *H04N 5/445* | (2011.01) |
| *G06T 7/73* | (2017.01) |
| *H04N 5/225* | (2006.01) |

(52) U.S. Cl.
CPC .............. *G06T 7/68* (2017.01); *G06K 9/4647* (2013.01); *G06K 9/6267* (2013.01); *G06T 7/73* (2017.01); *H04N 5/445* (2013.01); *G06T 2207/20081* (2013.01); *H04N 5/225* (2013.01)

(58) Field of Classification Search
CPC ... G06T 7/68; G06T 7/73; G06T 2207/20081; G06K 9/4647; G06K 9/6267; H04N 5/445; H04N 5/225
See application file for complete search history.

(56) References Cited

U.S. PATENT DOCUMENTS

| | | | |
|---|---|---|---|
| 10,311,311 B1* | 6/2019 | Wang | G06K 9/00791 |
| 2002/0041705 A1* | 4/2002 | Lin | G06K 9/3241 |
| | | | 382/165 |
| 2016/0180157 A1* | 6/2016 | Alcoverro Vidal | ........................ |
| | | | G06K 9/00201 |
| | | | 382/103 |

OTHER PUBLICATIONS

Yang et al., "Aggregate Channel Features for Multi-View Face Detection", Sep. 3, 2014.*

* cited by examiner

*Primary Examiner* — Michael E Teitelbaum
(74) *Attorney, Agent, or Firm* — Holland & Hart LLP

(57) ABSTRACT

Methods, systems, and devices for object detection are described. A device may extract features from an image and identify a region within the image for object detection. The device may apply an object model to a first set of features corresponding to positions within the region and one or more channels of the image. The first set of features may be selected so that the object model can detect a first orientation of an object. The device may also apply the object model to a second set of features, from the region, that are different from the first set of features. The second set of features may be selected so that the object model can detect a second orientation of the object (e.g., a flipped or rotated orientation of the object with respect to the first orientation).

12 Claims, 9 Drawing Sheets

HORIZONTAL SYMMETRY

VERTICAL SYMMETRY

ROTATIONAL SYMMETRY

SYMMETRY EXPLOITATION FOR OBJECT DETECTION IN IMAGES

BACKGROUND

The following relates generally to object detection, and more specifically to symmetry exploitation for object detection.

Object detection may refer to a field of computer vision for finding objects in an image or video sequence and distinguishing them from other aspects of the image or video sequence. At a high level of abstraction, object detection may be implemented by extracting features from an image and comparing those features with threshold values. For example, the extracted features may be operated on by one or more classifiers of an object model. The classifiers may operate on the features by comparing the values of the features to threshold values as defined by the object model. Each classifier may return an output value based on the outcome of the comparisons, and the values from multiple classifiers may be aggregated to determine whether an object is in fact within the image.

For a single category of object there may be many object models so that the object can be recognized in different orientations. For example, for vehicle detection there may be an object model for every orientation of a vehicle with respect to the camera (e.g., head-on versus broadside, etc.). In order for an object model to work properly, it may be trained and stored prior to use. But training and storing object models for each orientation of an object category may require a significant amount of time and memory.

SUMMARY

The described techniques relate to improved methods, systems, devices, or apparatuses that support symmetry exploitation for object detection. A device may extract features from an image and identify a region within the image for object detection. The device may apply an object model to a first set of features corresponding to positions within the region and one or more channels of the image. The first set of features may be selected so that the object model can detect a first orientation of an object. The device may also apply the object model to a second set of features, from the region, that are different from the first set of features. The second set of features may be selected so that the object model can detect a second orientation of the object (e.g., a flipped or rotated orientation of the object with respect to the first orientation).

A method of object detection is described. The method may include extracting a set of features from an image, identifying a set of the features corresponding to a region of the image, applying a classifier of a stored object model to a first feature of the set corresponding to a first position of the region and a first channel of the image, where the stored object model is associated with an object category that has a symmetry including one or more of: a horizontal symmetry, a vertical symmetry, or a rotational symmetry, applying the classifier of the stored object model to a second feature of the set corresponding to a second position of the region and a second channel of the image, the second position and second channel based on the first position, first channel, and symmetry of the object category, and outputting an indication that the region of the image includes an object of the object category based on applying the classifier to the first and second features.

An apparatus for object detection is described. The apparatus may include a processor, memory in electronic communication with the processor, and instructions stored in the memory. The instructions may be executable by the processor to cause the apparatus to extract a set of features from an image, identify a set of the features corresponding to a region of the image, apply a classifier of a stored object model to a first feature of the set corresponding to a first position of the region and a first channel of the image, where the stored object model is associated with an object category that has a symmetry including one or more of: a horizontal symmetry, a vertical symmetry, or a rotational symmetry, apply the classifier of the stored object model to a second feature of the set corresponding to a second position of the region and a second channel of the image, the second position and second channel based on the first position, first channel, and symmetry of the object category, and output an indication that the region of the image includes an object of the object category based on applying the classifier to the first and second features.

Another apparatus for object detection is described. The apparatus may include a camera configured to capture an image and a display device in electronic communication with the camera. The display device may be configured to display the image. The apparatus may also include a graphics processor in electronic communication with the camera and the display device. The graphics processor may be configured to extract a set of features from an image, identify a set of the features corresponding to a region of the image, apply a classifier of a stored object model to a first feature of the set corresponding to a first position of the region and a first channel of the image, where the stored object model is associated with an object category that has a symmetry including one or more of: a horizontal symmetry, a vertical symmetry, or a rotational symmetry, apply the classifier of the stored object model to a second feature of the set corresponding to a second position of the region and a second channel of the image, the second position and second channel based on the first position, first channel, and symmetry of the object category, and output an indication that the region of the image includes an object of the object category based on applying the classifier to the first and second features.

Another apparatus for object detection is described. The apparatus may include means for extracting a set of features from an image, identifying a set of the features corresponding to a region of the image, applying a classifier of a stored object model to a first feature of the set corresponding to a first position of the region and a first channel of the image, where the stored object model is associated with an object category that has a symmetry including one or more of: a horizontal symmetry, a vertical symmetry, or a rotational symmetry, applying the classifier of the stored object model to a second feature of the set corresponding to a second position of the region and a second channel of the image, the second position and second channel based on the first position, first channel, and symmetry of the object category, and outputting an indication that the region of the image includes an object of the object category based on applying the classifier to the first and second features.

A non-transitory computer-readable medium storing code for object detection is described. The code may include instructions executable by a processor to extract a set of features from an image, identify a set of the features corresponding to a region of the image, apply a classifier of a stored object model to a first feature of the set corresponding to a first position of the region and a first channel of the image, where the stored object model is associated with an object category that has a symmetry including one or more of: a horizontal symmetry, a vertical symmetry, or a rotational symmetry, apply the classifier of the stored object model to a second feature of the set corresponding to a second position of the region and a second channel of the image, the second position and second channel based on the first position, first channel, and symmetry of the object category, and output an indication that the region of the image includes an object of the object category based on applying the classifier to the first and second features.

Some examples of the method, apparatuses, and non-transitory computer-readable medium described herein may further include operations, features, means, or instructions for selecting the second feature corresponding to the second position based on the height of the region, the width of the region, or both.

In some examples of the method, apparatuses, and non-transitory computer-readable medium described herein, applying the classifier to the first feature and applying the classifier to the second feature may include operations, features, means, or instructions for applying the classifier to the first feature and the second feature concurrently.

In some examples of the method, apparatuses, and non-transitory computer-readable medium described herein, applying the classifier to the first feature and applying the classifier to the second feature may include operations, features, means, or instructions for comparing the first feature to a first threshold and comparing the second feature to the first threshold.

Some examples of the method, apparatuses, and non-transitory computer-readable medium described herein may further include operations, features, means, or instructions for determining whether to compare a third feature to a second threshold or a fourth feature to a third threshold based on comparing the first feature to the first threshold and determining whether to compare a fifth feature to the second threshold or a sixth feature to the third threshold based on comparing the second feature to the first threshold.

In some examples, the first position and second position each comprise a column component. In such examples, the method, apparatuses, and non-transitory computer-readable medium described herein may further include operations, features, means, or instructions for selecting, when the object category may have horizontal symmetry, the second feature based on the column component of the second position being a width of the region minus the column component of the first position.

In some examples, the first position and second position each comprise a row component. In such examples, the method, apparatuses, and non-transitory computer-readable medium described herein may further include operations, features, means, or instructions for selecting, when the object category may have vertical symmetry, the second feature based on the row component of the second position being a height of the region minus the row component of the first position.

In some examples, the first channel corresponds to a first angle and the second channel corresponds to a second angle. In such examples, the method, apparatuses, and non-transitory computer-readable medium described herein may further include operations, features, means, or instructions for selecting, when the object category may have horizontal symmetry, the second feature based on the second angle being a result of the first angle subtracted from a predetermined set of degrees.

In some examples, the first channel corresponds to a first angle and the second channel corresponds to a second angle. In such examples, the method, apparatuses, and non-transitory computer-readable medium described herein may further include operations, features, means, or instructions for selecting, when the object category may have rotational symmetry, the second feature based on the second angle being the first angle plus a predetermined set of degrees.

In some examples of the method, apparatuses, and non-transitory computer-readable medium described herein, the first channel may be a gradient histogram channel corresponding to a first direction and the second channel may be a gradient histogram channel corresponding to a second direction.

DETAILED DESCRIPTION

Object detection refers to a field of computer vision for finding objects in an image or video sequence and distinguishing them from other aspects of the image or video sequence. Object detection may be implemented through the use of object models (or "object templates") that define operations performed on features of an image. Conventionally, there may be an object model for each detectable orientation of an object category that a device is configured to detect. For example, if a device is configured to detect 60 different orientations of a person's face (e.g., five yaw bins ranging from −90° to 90° and twelve roll bins ranging from 0° to 360°), the device may store 60 different object models. But in order to function properly, each of these object models may be trained prior to use. Training and storing an object model for each orientation of an object that a device is configured to detect may consume significant time and storage resources.

According to the techniques described herein, a device may reduce training overhead and storage consumption by training and storing a reduced set of object models compared to the quantity of object orientations that the device is configured to detect. To reduce the number of object models trained and stored, yet still detect the same number of orientations, the device may use a single object model to detect different orientations of an object by exploiting symmetries in certain object categories. For example, the device may apply an object model for a left-looking face to features extracted from an image in such a manner that the device is also able to detect a right-looking face. In the example of facial detection, such exploitation of symmetries may allow the device to reduce the number of object models from 60 to three.

Aspects of the disclosure are initially described in the context of a digital image and process flows related to symmetry exploitation for object detection. Aspects of the disclosure are further illustrated by and described with reference to apparatus diagrams, system diagrams, and flowcharts that relate to symmetry exploitation for object detection.

Figure 1:
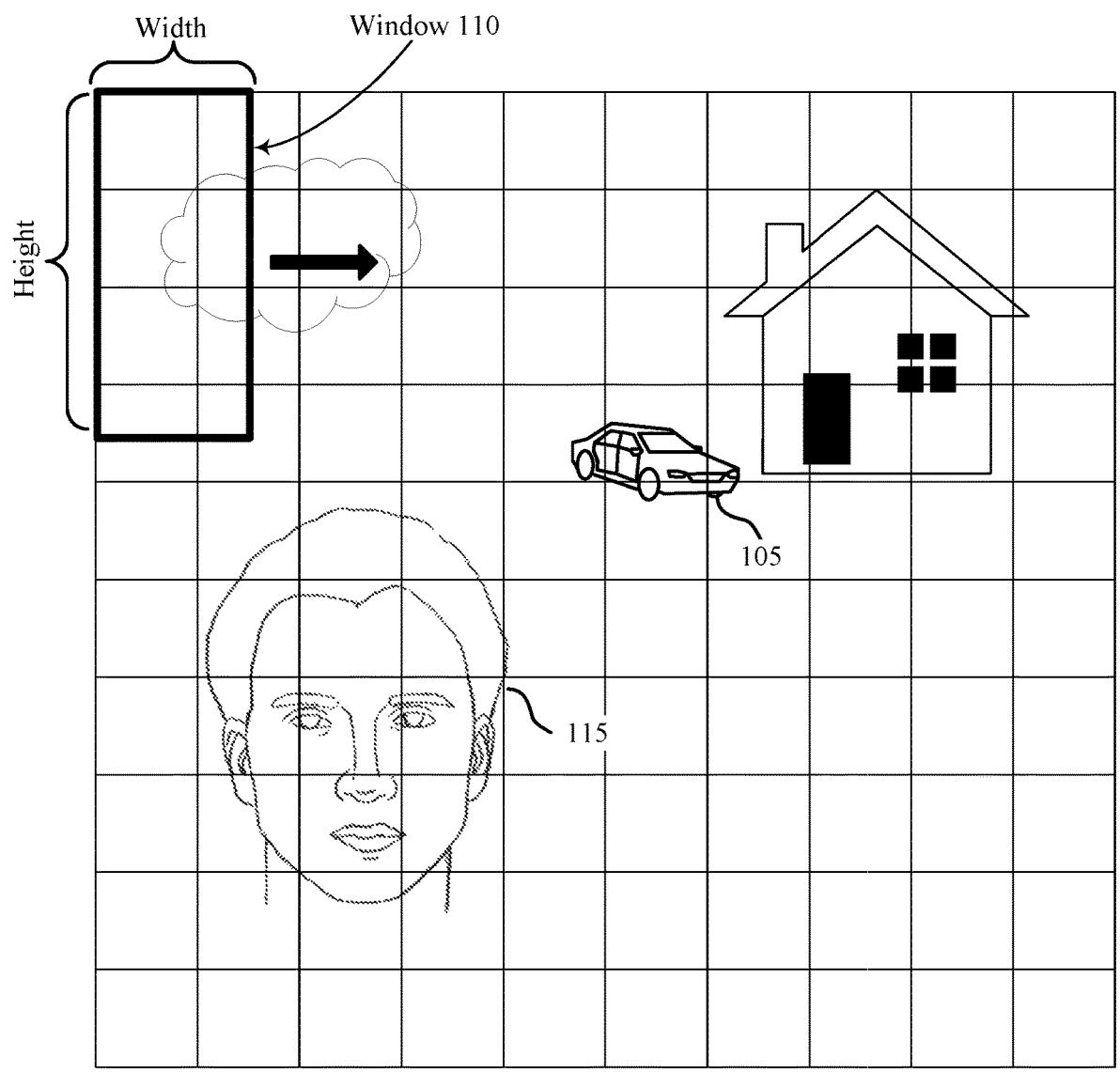
FIG. 1 illustrates a digital image that supports symmetry exploitation for object detection in accordance with the present disclosure.

FIG. 1 illustrates a digital image 100 that is made up of a plurality of pixels. Digital image 100 may be obtained in a variety of ways in accordance with the present disclosure. For example, digital image 100 may be obtained by an image sensor such as a camera which is interoperable with a processor (e.g., a graphics processor) capable of implementing aspects of the present disclosure. Additionally or alternatively, digital image 100 may be obtained by a device (e.g., a wireless device) via a transmission received from another device (e.g., over a wireless link, a wired link, a portable memory, etc.). The device may process digital image 100 by applying operations to the pixels that makeup the digital image 100. For example, the device may extract features from the digital image 100 which may be used for object detection or classification. A feature may be a characteristic of an image that is represented by a number (e.g., a real number of a limited set of numbers where each number has a predefined meaning).

In some cases, the device may extract aggregate channel features (ACF) features from an image for detection purposes. ACF features may be determined based on the pixel values of various image channels. Each of these channels may be generated by the device and may represent different aspects—and provide different information—about the underlying repetition. For example, for ACF there may be ten channels generated for an image: three color channels, one gradient magnitude channel, and six gradient histogram channels (or "histogram channels"). Unlike the color channel and gradient magnitude channel, each histogram channel may be associated with direction or angle. For example, a histogram channel may represent the distribution of a gradient angle (e.g., 30°) within an image.

Thus, ACF features may include a set of features (e.g., a feature-space) for each pixel in an image. For example, there may be ten features for each pixel in an image, and each of these features may be extracted or derived from one of the ten channels generated for the image. The location or position of a pixel corresponding to a set of ACF features may be defined or represented by a horizontal component (e.g., an "x-component" or "column component") and a vertical component (e.g., a "y-component" or "row component"). The horizontal component may indicate where in x-dimension a pixel is located, and the vertical component may indicate where in y-dimension a pixel is located.

In some cases, a feature may further be identified or indexed by a channel component (e.g., a c-component), which indicates the channel from which the feature was derived. Thus, a feature extracted from a position with index (x, y) within in an image channel c may be denoted f(x, y, c). Although described with reference to ACF, the object detection techniques described herein can be implemented using any type of feature extraction algorithm that has an appropriate symmetry.

Once the ACF features are extracted from an image, the features for a particular region of the image may be selected for object detection using a sliding window technique. A sliding window technique may involve a virtual "window" 110 that has a height H and a width W. The height and width of a window may represent the quantity of pixels the window spans (e.g., a window may have a height that spans 20 pixels and a width that spans 20 pixels). The window 110 may be translated across the image in a progressive pattern, and each new area covered by the window may be a region that is selected for object detection. Thus, the total number of features extracted from a region (whose dimensions are determined by the window) may be the number of channels multiplied by the number of pixels in the region (e.g., the total number of ACF features extracted from a region may be 10×H×W). After the window 110 has covered every pixel in the image, the size of the window (e.g., the height and width of the window) may be varied so that regions of different sizes undergo object detection.

The features extracted from an image may enable a device to differentiate certain objects within an image from others. For example, the features may be input into object models that operate on the features to determine a likelihood that an object is within the image. To detect objects of different types, or in different categories, a device may employ different sets of object models. For example, a device may employ one set of object models when attempting to detect a vehicle (e.g., vehicle 105) and employ a different set of object models when attempting to detect a person's face (e.g., face 115).

Typically, a set of object models for an object category may include an object model for each detectable orientation of the object. But training an object model for each detectable orientation of an object may be time consuming, and storing each of these object models may take up memory space that could be used for other applications. According to the techniques described herein, a device may reduce the quantity of object models used to detect an object by exploiting the symmetry of the object. For example, an object within a region of an image may be detected by applying the same object model not only to a set of features within the region, but also to "flipped" or "rotated" set of features within the region. Because the same model can be used to detect multiple orientations of the same object, a device storing the model can avoid training and storing other models for those orientations.

Figure 2:
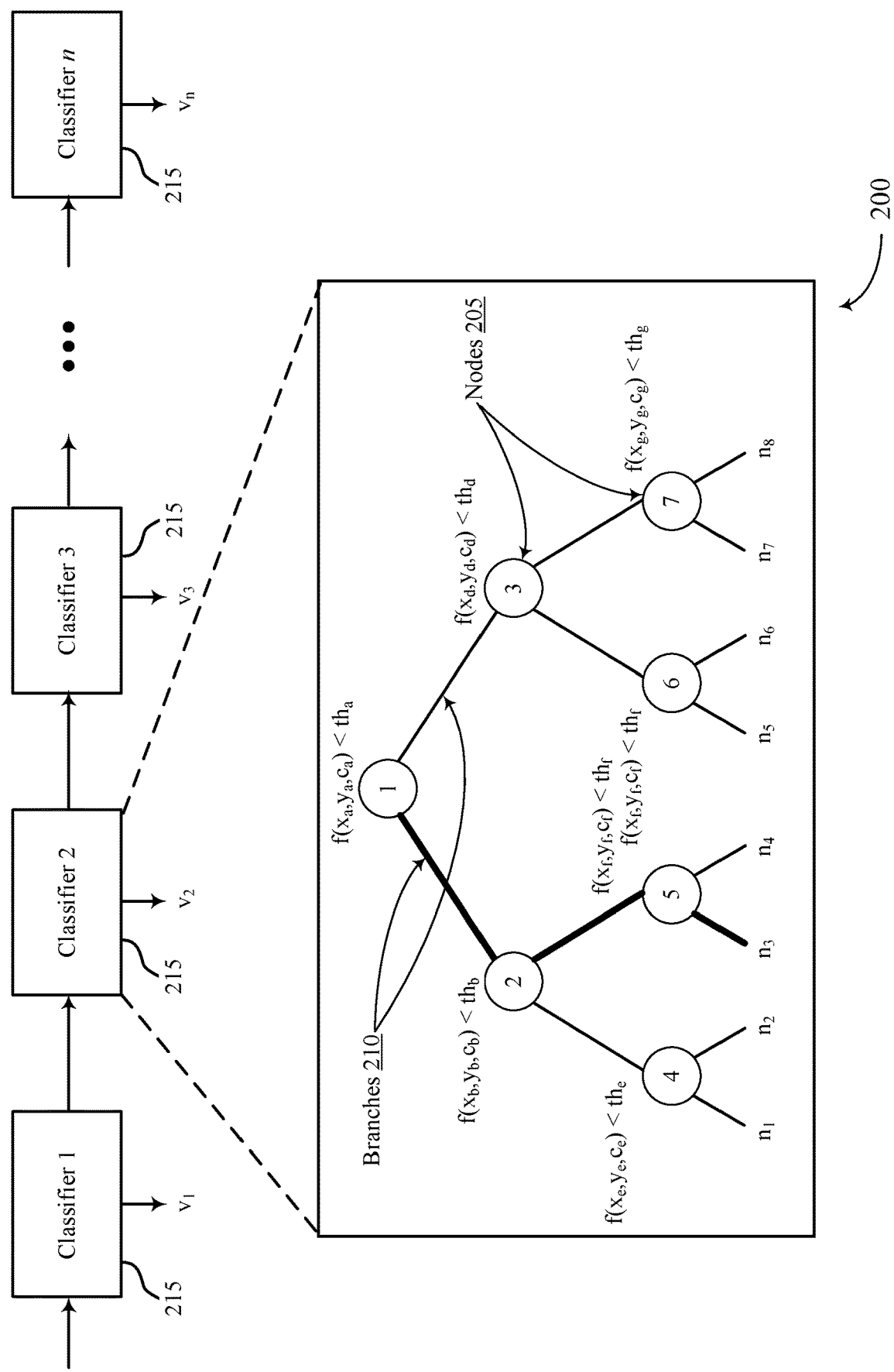
FIG. 2 illustrates an object model that supports symmetry exploitation for object detection in accordance with the present disclosure.

FIG. 2 illustrates an object model 200 that supports symmetry exploitation for object detection in accordance with the present disclosure. Object model 200 may be an object model for any object category that has at least one type of symmetry, including horizontal symmetry, vertical symmetry, and rotational symmetry. Such symmetries are described with respect to FIGS. 3A through 3C. Object model 200 may include multiple (e.g., n, where n is greater than one) classifiers 215 (e.g., weak classifiers). A classifier 215 may be a collection of decision trees (e.g., a classifier may be random decision forest (RDF)) that operates on features extracted from an image and that returns or outputs a value (e.g., $v_1$, $v_2$, etc.) based on the results of the operations. Although shown as a decision tree with three levels, a classifier 215 may be any number of levels, and different classifiers within an object model may have different numbers of levels.

To determine if an image (or region of an image) includes an object associated with the model, the values output by the classifiers 215 may be aggregated (e.g., summed) and compared to a threshold value. The device may determine whether an object has been detected based on the result of the comparison. For example, if the sum of the values is less than the threshold value, then the device performing the object detection process may determine that object is not within the image (or region of the image). If the sum of the values is greater than the threshold value, the device may determine that the object is in fact within the image (or region of the image).

Each classifier 215 may operate on a set of features which are represented by values. As discussed herein, the feature values from spatial location $(x_k, y_k)$ and associated with (e.g., based on or extracted from) channel $c_k$ may be denoted (e.g., indexed as) $f(x_k,y_k,c_k)$. Put another way, the feature values corresponding to column component $x_k$, row component $y_k$, and channel component $c_k$ may be referred to as $f(x_k,y_k,c_k)$. To detect an object within a region of an image, the classifiers 215 may be applied to features from various positions within the region (as defined by the sliding window). The positions and channels of the features input into the classifiers 215 may be based on training.

A classifier 215 may include multiple conceptual nodes 205 that operate on received features by comparing the values of the features to threshold values and making decisions about which branch 210 in the decision tree to follow based on the result of the comparisons. The threshold values and tree branches may be determined at training and stored in memory. In the example shown in FIG. 2, a first node (e.g., node 1) operates on a feature corresponding to a first spatial location and channel (e.g., $f(x_a,y_a,c_a)$) by comparing the value of the feature with a threshold value (e.g., threshold value $th_a$). If the threshold value is exceeded, the node may follow the branch that leads to node 3. If the threshold value is not exceeded, the node may follow the branch that leads to node 2. This example is shown in FIG. 2. Thus, the comparison of a feature at one level may be based on the result of a comparison at a higher level. Put another way, the comparison of a feature may serve as a basis for determining which of several possible comparisons is performed next.

At the next level of the decision tree (e.g., level two), whichever node that was selected by node 1 may operate on a feature associated with a different index (e.g., a different location, as given by row and column components, and/or a different channel). For example, node 2 may operate on $f(x_b,y_b,c_b)$ by comparing the feature value to threshold value $th_b$, or node 3 may operate on $f(x_a,y_a,c_a)$ by comparing the feature value to threshold value $th_d$. If the threshold value is not exceeded, the node in operation may follow the branch that leads to the left. If the threshold value is exceeded, the node in operation may follow the branch that leads to the right. Thus, in the example, shown in FIG. 2, node 2 may follow the branch that leads to node 5.

At the next level of the decision tree (e.g., level three), comparison and decision process may be performed again, this time on a new feature (e.g., a feature from a different location and/or corresponding to a different channel). In the example shown in FIG. 2, node 5 may compare the value of feature $f(x_f,y_f,c_f)$ to threshold value $th_f$. If, as shown in FIG. 2, the threshold value is not exceeded, classifier 2 may output value $n_3$ as $v_2$. On the other hand, if the threshold value is exceeded, classifier 2 may output value $n_4$ as $v_2$. Classifiers 1 and 3 through n may perform similar operations as classifier 2, and the outputs of each may be combined to detect an object of the category for which the object model 200 was trained.

In some cases, a device configured to detect an object in any of p orientations may train and store an object model for each orientation the device is configured to detect (e.g., the device may train and store p object models). But training and storing p object models to detect p orientations may consume time and memory. According to the techniques described herein, the number of object models may be reduced, relative to the number of detectable object orientations, by using the same object model to detect multiple orientations of an object. This can be accomplished by applying the object model not only to features corresponding to a first orientation of an object, but also to features corresponding to flipped or rotated versions of the object.

For example, a device that has trained and stored an object model to detect a first orientation of an object may use the object model to detect a flipped version of the object by applying the object model to features from positions that mirror those used to detect the object in the first orientation. For instance, if the object is in a horizontally flipped orientation, instead of applying the object model to a feature from a first position in a region of the image, the object model may be applied to a feature from a second position of the region that has a column component that is equal to the region width minus the column component of the first position. Similarly, if the object is in a vertically flipped orientation, instead of applying the object model to a feature from a first position in a region of the image, the object model may be applied to a feature from a second position of the region that has a row component that is equal to the region height minus the row component of the first position.

Figure 3A:
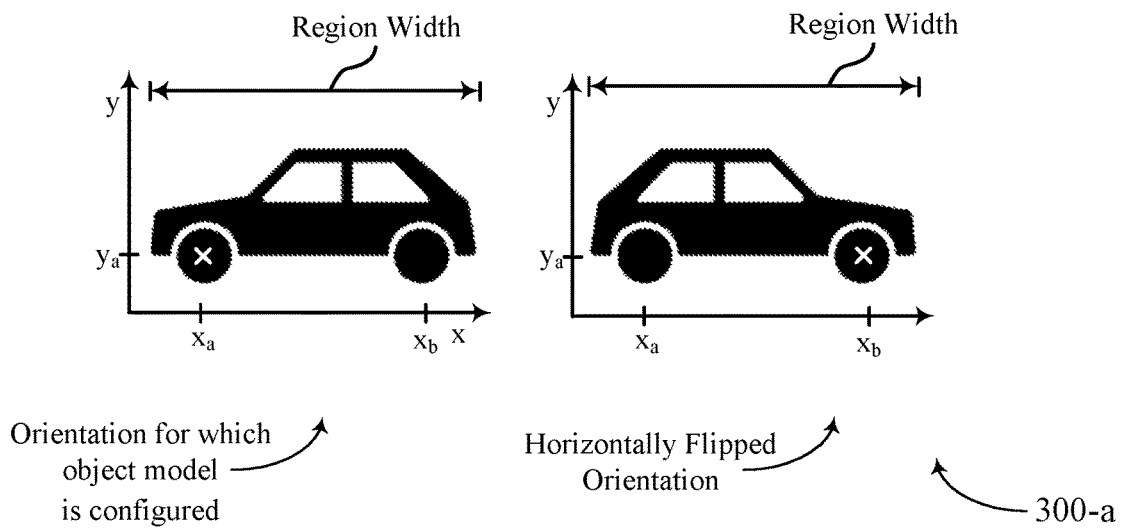
FIG. 3A illustrates an example of an object that has horizontal symmetry.
Figure 3B:
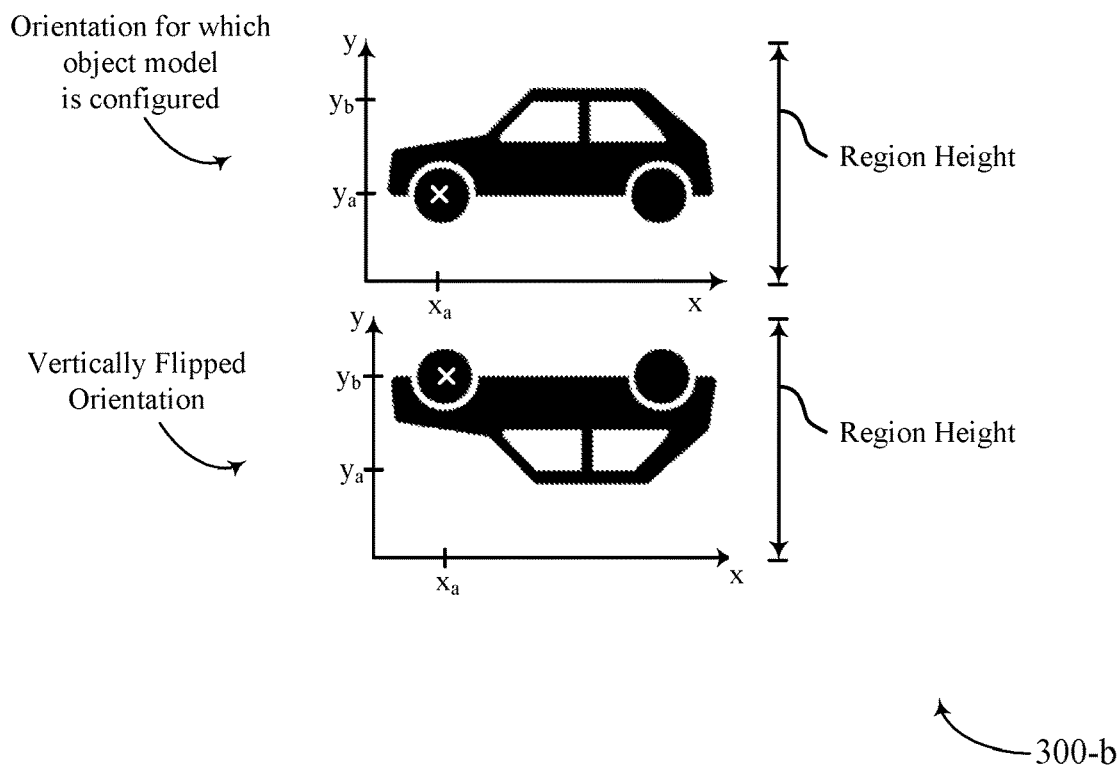
FIG. 3B illustrates an example of an object that has vertical symmetry.
Figure 3C:
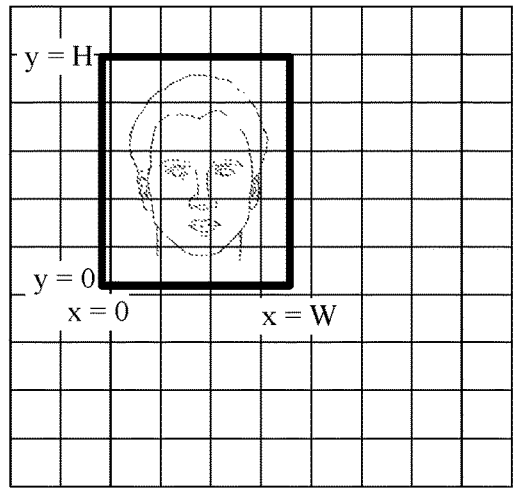
FIG. 3C illustrates an example of an object that has rotational symmetry.
Figure 3C:
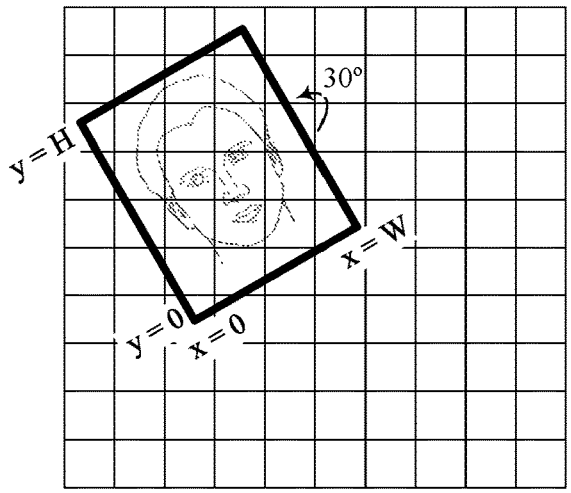

FIGS. 3A through 3C illustrate examples of object symmetries that support symmetry exploitation for object detection in accordance with various aspects of the present disclosure. Objects from object categories with symmetries as described with reference to FIGS. 3A through 3C may be detected using a single object model even when they are in different orientations.

FIG. 3A illustrates an example of an object (e.g., a vehicle) that has horizontal symmetry 300-a. An object may have horizontal symmetry if reflecting the object horizontally (e.g., around a y-axis at the center of the object) results in a mirror image of the object. When an object has horizontal symmetry, the pixel a position $(x_a, y_a)$ for a first configuration of the object (e.g., a left-facing configuration) may be the same as the pixel located at position $(x_b, y_a)$ for a second configuration of the object that is horizontally flipped with respect to the first configuration (e.g., a right-facing configuration). Thus, an object model for a left-facing vehicle may be used to detect a right-facing vehicle by modifying the position index (e.g., the column components) of the features operated on by the model. For example, if the region undergoing detection has a width of W, the model may operate on one or more features from position $(x_a, y_a)$ to detect a left-facing vehicle and may operate on one or more features from position $(W-x_a, y_a)$ to detect a right-facing vehicle.

But the model for detecting left-facing vehicles may not be able to detect the right-facing vehicle unless the histogram channel index is also modified to take advantage of the object's horizontal symmetry. As noted, ACF features includes three color channels, one gradient magnitude, and six histogram channels (e.g., for 0°, 30°, 60°, 90°, 120°, and 150°). The histogram channels may be referred to herein as channel 1, channel 2, channel 3, channel 4, channel 5, and channel 6.

Although the color channels and gradient magnitude are independent of rotation (and thus horizontal flipping), the histogram channels each have a direction. This means the feature values extracted from a histogram channel of an image may be equal to the feature values extracted from a different histogram channel of a flipped version of the image. For example, when the left-facing vehicle is horizontally flipped, the features extracted from histogram channel $c_2$ and histogram channel $c_6$ are switched. Thus, an object model for a left-facing vehicle may be used to detect a right-facing vehicle by modifying the channel of the features operated on by the model. Continuing the foregoing example, the model may operate on features from spatial location $(x_a, y_a)$ and channel 2 to detect a left-facing vehicle and may operate on features from spatial location $(W-x_a, y_a)$ and channel 6 to detect a right-facing vehicle.

When the six histogram channels span 180° in 30° increments, a permutation table such as Table 1 may be used to select the channel that should be used when applying an object template to detect a horizontally flipped object. In general (channels 1 and 4 are exceptions), the channel used to detect a horizontally flipped version of an image may be the channel corresponding to an angle that is equal to 180° (e.g., a predetermined plurality of degrees) minus the angle of the channel used to detect the un-flipped model.

TABLE 1

| Channel to detect un-flipped object | Channel to detect horizontally flipped object |
|---|---|
| Channel 1 (0°) | Channel 1 (0°) |
| Channel 2 (30°) | Channel 6 (150°) |
| Channel 3 (60°) | Channel 5 (120°) |
| Channel 4 (90°) | Channel 4 (90°) |
| Channel 5 (120°) | Channel 3 (60°) |
| Channel 6 (150°) | Channel 2 (30°) |

As shown in the table, when a feature from channel 1 is used to detect an object, a corresponding feature from channel 1 should also be used to detect a horizontally flipped version of the object. When a feature from channel 2 is used to detect an object, a corresponding feature from channel 6 should be used to detect a horizontally flipped version of the object. When a feature from channel 3 is used to detect an object, a corresponding feature from channel 5 should be used to detect a horizontally flipped version of the object. When a feature from channel 4 is used to detect an object, a corresponding feature from channel should be used to detect a horizontally flipped version of the object. When a feature from channel 5 is used to detect an object, a corresponding feature from channel 3 should be used to detect a horizontally flipped version of the object. And when a feature from channel 6 is used to detect an object, a corresponding feature from channel 2 should be used to detect a horizontally flipped version of the object.

Although the histogram channels of features input into a model may be changed when attempting to detect a horizontally flipped version of an object, other channels that are unaffected by horizontal flipping (e.g., the color and gradient magnitude channels) may remain the same.

FIG. 3B illustrates an example of an object (e.g., a vehicle) that has vertical symmetry 300-b. An object may have vertical symmetry if reflecting the object vertically (e.g., around an x-axis at the center of the object) results in a mirror image of the object. When an object has vertical symmetry, the pixel a position $(x_a, y_a)$ for a first configuration of the object (e.g., a right-side up configuration) may be the same as the pixel located at position $(x_a, y_b)$ for a second configuration of the object that is horizontally flipped with respect to the first configuration (e.g., an upside-down configuration). Thus, an object model for a right-side up vehicle may be used to detect an upside-down vehicle by modifying the position index (e.g., the row components) of the features operated on by the model. For example, if the region undergoing detection has a height of H, the model may operate on one or more features from position $(x_a, y_a)$ to detect a right-side up vehicle and may operate on one or more features from position $(x_a, H-y_a)$ to detect an upside-down vehicle.

But the model for detecting right-side up vehicles may not be able to detect the upside-down vehicle unless the channel index is also modified to take advantage of the object's vertical symmetry. Similar to the technique described with reference to horizontal flipping, the channel from which features are extracted to detect a vertically flipped version of an object may be different than the channel from which features are extracted to detect an un-flipped version of the object. For instance, Table 1 may be used to determine the channels of features operated on by object template when it is being used to detect a vertically flipped object. Thus, an object model may, for example, operate on features from spatial location $(x_a, y_a)$ and channel 3 to detect a right-side up vehicle and may operate on features from spatial location $(x_a, H-y_a)$ and channel 5 to detect a right-facing vehicle.

Although the histogram channels of features input into a model may be changed when attempting to detect a vertically flipped version of an object, other channels that are unaffected by vertically flipping (e.g., the color and gradient magnitude channels) may remain the same.

FIG. 3C illustrates an example of an object (e.g., a face) that has rotational symmetry 300-c. An object may have rotational symmetry if rotating the object in the x-y plane results in a rotated, but otherwise identical, version of the object. According to the techniques described herein, a single stored object model may be used to detect an object with rotational symmetry when, e.g., the orientation of the object aligns with one of the histogram channel directions.

To detect a rotated version of an object using an object model for an un-rotated version of the object, a device may rotate the sliding window to an angle that matches that of the rotated object. For example, to detect a face that is rotated by 30° compared to the face for which the object model is configured, the sliding window may be rotated by 30° compared to the sliding window used to select the features for the orientation of the object for which the object template is configured. This way, a pixel that occurs at $(x_a, y_a)$ within the detection region is maintained at $(x_a, y_a)$ regardless of the rotation of the object. Thus, a device may rotate the sliding window so that the positions of the pixels of the rotated object relative to the rotated sliding window are the same as the positions of the pixels of the un-rotated object relative to an un-rotated sliding window.

However, the model for detecting a certain orientation of an object may not be able to detect a rotated version of the object unless the channel indices of features are modified to take advantage of the object's rotational symmetry. So a device may swap feature values from the histogram channels based on the rotation of the object. For example, if the object model is being applied to detect an object at 30° rotation, the device may select features from channel 2 in place of features from channel 1, features from channel 3 in place of features from channel 2, features from channel 4 in place of features from channel 3, etc.

When the six histogram channels span 180° in 30° increments, a permutation table such as Table 2 may be used to select the channel that should be used when applying an object template to detect an object that has been rotated by 30°. In general, the channel used to detect a rotated version of an object may be the channel corresponding to an angle that is equal to the angle of the channel for the un-rotated object plus the number of degrees by which the object is rotated.

TABLE 2

| Channel to detect un-rotated object | Channel to detect object rotated by 30° |
|---|---|
| Channel 1 (0°) | Channel 2 (30°) |
| Channel 2 (30°) | Channel 3 (60°) |
| Channel 3 (60°) | Channel 4 (90°) |
| Channel 4 (90°) | Channel 5 (120°) |
| Channel 5 (120°) | Channel 6 (150°) |
| Channel 6 (150°) | Channel 1 (0°) |

Thus, a model may, for example, operate on features from spatial location ($x_a$, $y_a$) and channel 3 to detect an upright face and may operate on features from spatial location ($x_a$, $y_a$) and channel 4 to detect a rotated face.

Although the histogram channels of features input into a model may be changed when attempting to detect a rotated version of an object, other channels that are unaffected by rotation (e.g., the color and gradient magnitude channels) may remain the same.

Figure 4:
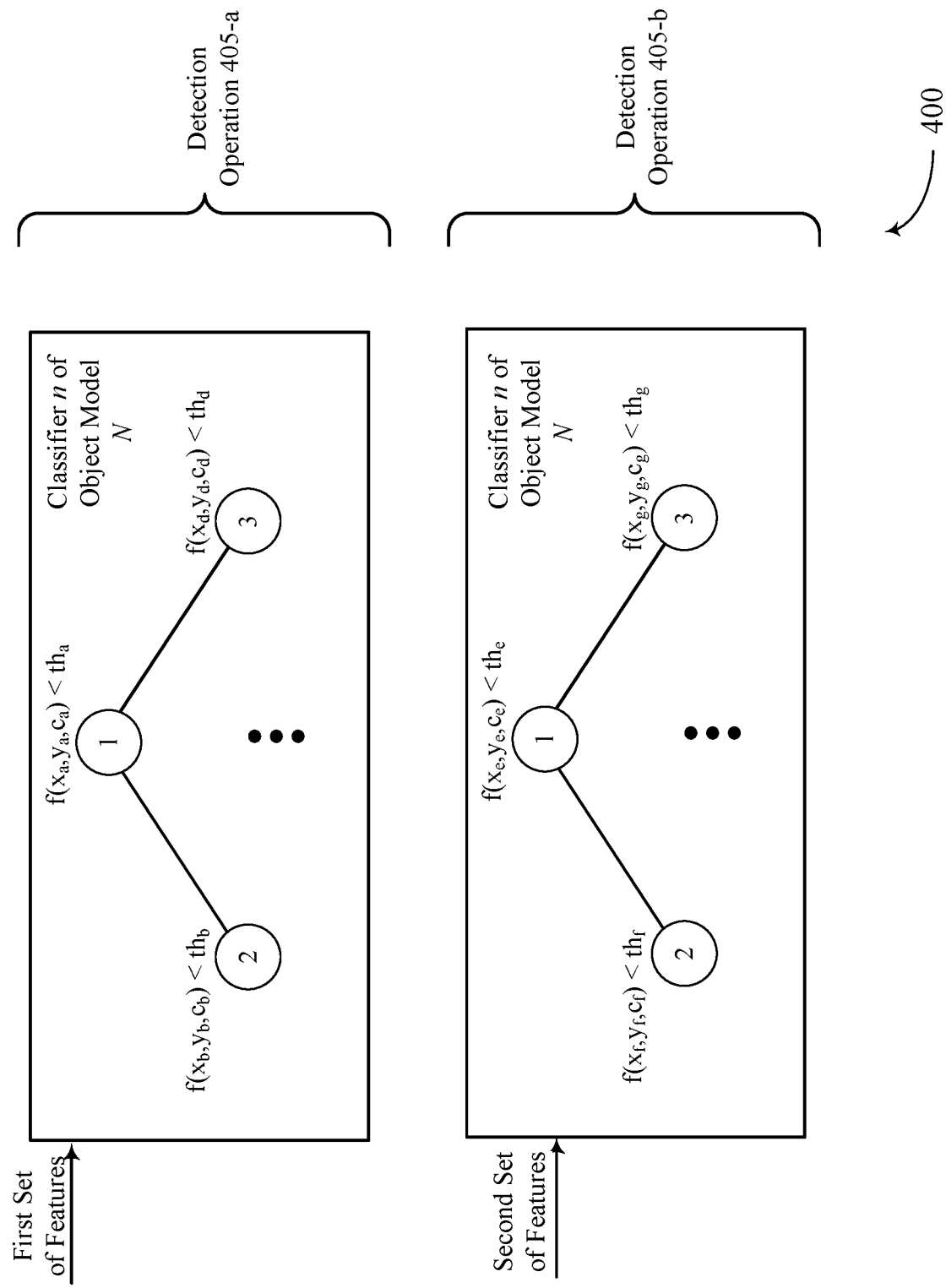
FIG. 4 illustrates aspects of a detection process that supports symmetry exploitation in accordance with aspects of the present disclosure.

FIG. 4 illustrates aspects of a detection process 400 that supports symmetry exploitation in accordance with aspects of the present disclosure. Detection process 400 may include a first detection operation 405-a and a second detection operation 405-b. The first detection operation 405-a may include applying a classifier (e.g., classifier n) of an object model (e.g., object model N) to a set of features selected based on first orientation of the object (e.g., an orientation object model N is configured to detect). The second detection operation 405-b may include applying the same classifier (e.g., classifier n) of the object model (e.g., object model N) to a different set of features selected based on a second orientation of the object (e.g., a flipped or rotated version of the object relative to the orientation the object model is configured to detect). The first detection operation 405-a and the second detection operation 405-b may be performed in parallel (e.g., concurrently) so that the classifier n is applied to different features at the same time, or nearly the same time.

The classifier n may be an example of a classifier described with reference to FIG. 2, and the object model N may be an example of an object model described with reference to FIG. 2. The object model N may be stored in memory and may be configured or trained to detect an object within an object category that has horizontal symmetry, vertical symmetry, and/or rotational symmetry. To detect such an object within a region of an image, a device may implement the first detection operation 405-a and the second detection operation 405-b, among others.

A device configured to implement the first detection operation 405-a may apply classifier n a first set of features from the region. The first set of features may include a first feature that corresponds to a first position in the region (e.g., $x_a$, $y_a$) and a first channel (e.g., channel $c_a$) of the image. The first set of features may include other features (e.g., $f(x_b, y_b, c_b)$, $f(x_d, y_d, c_d)$, etc.) that correspond to different locations within the region, different channels of the image, or both. The first set of features may be selected based on the orientation of the object. Classifier n may operate on the first set of features as described with reference to FIG. 2.

In addition to implementing the first detection operation 405-a, the device may implement the second detection operation 405-b by applying classifier n to a second set of features from the region. The second set of features may include a second feature that corresponds to a second position in the region (e.g., $x_e, y_e$) and a second channel (e.g., channel $c_e$) of the image. In some cases, the second position is the same as the first position (e.g., when attempting to detect a rotated version of the object) or the second channel is the same as the first channel (e.g., when attempting to detect a flipped version of the object). The second set of features may include other features (e.g., $f(x_f, y_f, c_f)$, $f(x_g, y_g, c_g)$) that correspond to different locations within the region, different channels of the image, or both. As discussed herein, the second set of features may be selected based on the first position, first channel, and symmetry of the object category. Classifier n may operate on the second set of features as described with reference to FIG. 2.

Some examples are now described in the context of particular symmetries. In one example, the device may attempt to detect an object with horizontal symmetry. In this case, the device may select (e.g., application of classifier n) the second feature so that the column component (e.g., the x-component) of its position is equal to the width of the region minus the column component of the first feature's position. For example, if the region has a width W and the first feature is from position (17, 8), the device may select the second feature to be from position (W−17, 8). The device may also select the second feature so that the angle corresponding to the second channel is equal to 180° minus the angle corresponding to the first channel. For example, if the first channel is channel 3 (which corresponds to 60°), the device may select the second feature to be from channel 5 (which corresponds to 120°). Similar adjustments may be made for the other features in the second set of features.

In another example, the device may attempt to detect an object with vertical symmetry. In this case, the device may select (e.g., for application of classifier n) the second feature so that the row component (e.g., the y-component) of its position is equal to the height of the region minus the row component of the first feature's position. For example, if the region has a height H and the first feature is from position (17, 8), the device may select the second feature to be from position (17, H−8). The device may also select the second feature so that the angle corresponding to the second channel is equal to 180° minus the angle corresponding to the first channel. For example, if the first channel is channel 2 (which corresponds to 30°), the device may select the second feature to be from channel 6 (which corresponds to 150°). Similar adjustments may be made for the other features in the second set of features.

In another example, the device may attempt to detect an object with rotational symmetry. In this case, the device may select (e.g., for application of classifier n) the second feature so that it is from the same position as the first feature. For example, if the first feature is from (17, 8), the device may select the second feature to also be from (17, 8). However, the device may select the second feature so that the angle corresponding to the second channel is equal to the angle of rotation plus the angle corresponding to the first channel. For example, if the angle of rotation is 30° and the first channel is channel 3 (which corresponds to 60°), the device may select the second feature to be from channel 4 (which corresponds to 90°). Similar adjustments may be made for the other features in the second set of features.

Although described as separate techniques, the techniques for selecting features to detect horizontally flipped, vertically flipped, and rotated versions of an object may be combined based on the symmetry of the object. And although shown as applying classifier n twice (once to each set of features), the techniques described herein can be implemented by applying classifier n any number of times (e.g., classifier n may be applied k times to k different sets of features which correspond to k configurations of an object).

Figure 5:
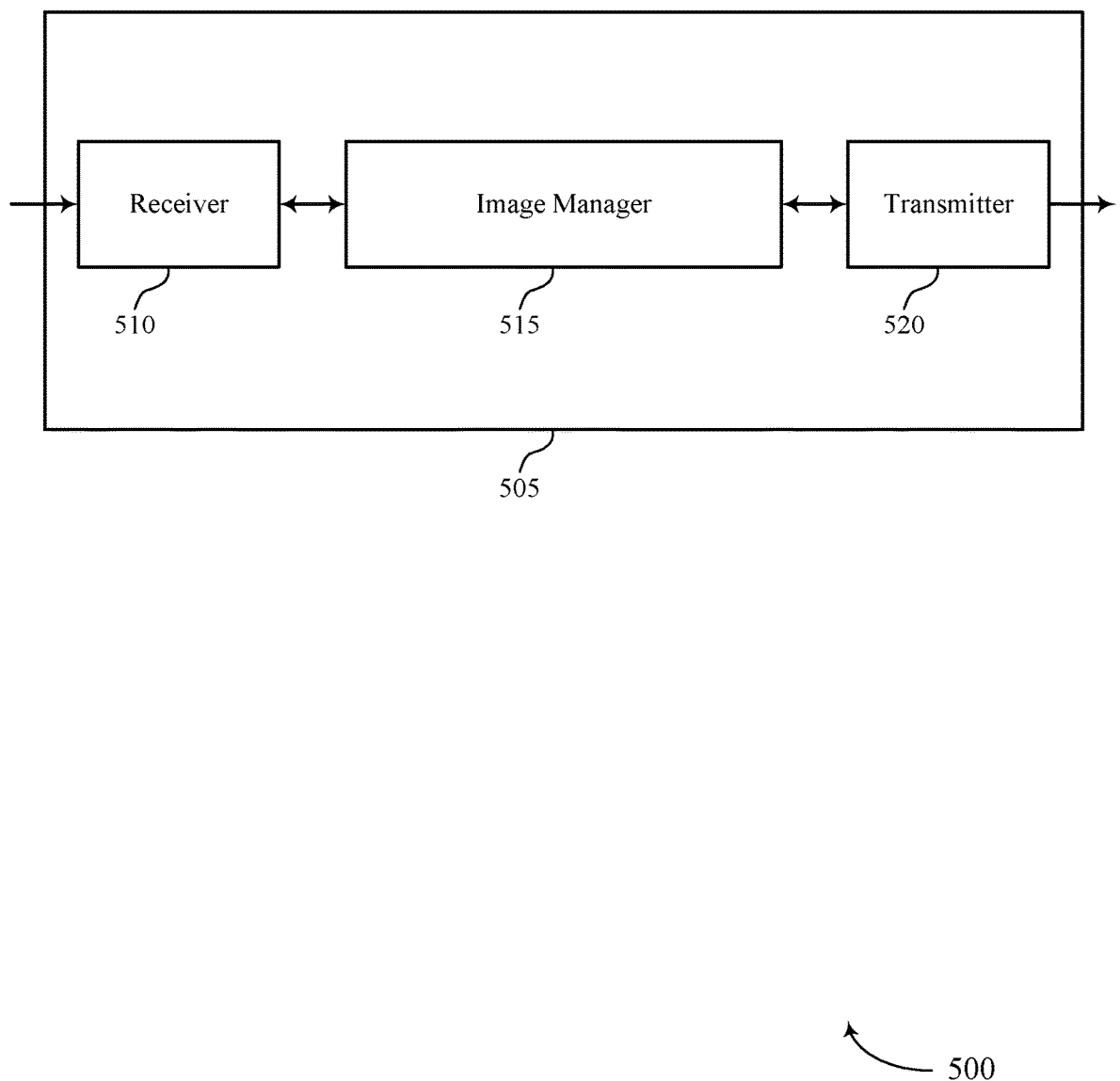
FIG. 5 shows a block diagram of a device that supports symmetry exploitation for object detection in accordance with aspects of the present disclosure.

FIG. 5 shows a block diagram 500 of a device 505 that supports symmetry exploitation for object detection in accordance with aspects of the present disclosure. The device 505 may be an example of aspects of a processing device as described herein. The device 505 may include a receiver 510, an image manager 515, and a transmitter 520. The device 505 may also include a processor (e.g., a graphics processor). Each of these components may be in communication with one another (e.g., via one or more buses).

Receiver 510 may receive information such as packets, user data, or control data (e.g., information related to object detection). Information may be passed on to other components of the device 505. The receiver 510 may be an example of aspects of the transceiver 720 described with reference to FIG. 7. The receiver 510 may use a single antenna or a set of antennas.

The image manager 515 may extract a plurality of features from an image (e.g., a digital image). The image manager 515 may identify a set of the features corresponding to a region of the image. The image manager 515 may apply a classifier of a stored object model to a first feature of the set corresponding to a first position of the region and a first channel of the image. The stored object model may be associated with an object category that has horizontal symmetry, vertical symmetry, and/or rotational symmetry. The image manager 515 may apply the classifier of the stored object model to a second feature of the set corresponding to a second position of the region and a second channel of the image, the second position and second channel based on the first position, first channel, and symmetry of the object category. The image manager 515 may output an indication that the region of the image includes an object of the object category based on applying the classifier to the first and second features. The image manager 515 may be an example of aspects of the image manager 710 described herein.

The image manager 515, or its sub-components, may be implemented in hardware, code (e.g., software or firmware) executed by a processor, or any combination thereof. If implemented in code executed by a processor, the functions of the image manager, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The image manager 515, or its sub-components, may be physically located at various positions, including being distributed such that portions of functions are implemented at different physical locations by one or more physical components. In some examples, the image manager 515, or its sub-components, may be a separate and distinct component in accordance with various aspects of the present disclosure. In some examples, the image manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 520 may transmit signals generated by other components of the device. In some examples, the transmitter 520 may be collocated with a receiver 510 in a transceiver module. For example, the transmitter 520 may be an example of aspects of the transceiver 720 described with reference to FIG. 7. The transmitter 520 may utilize a single antenna or a set of antennas.

Figure 6:
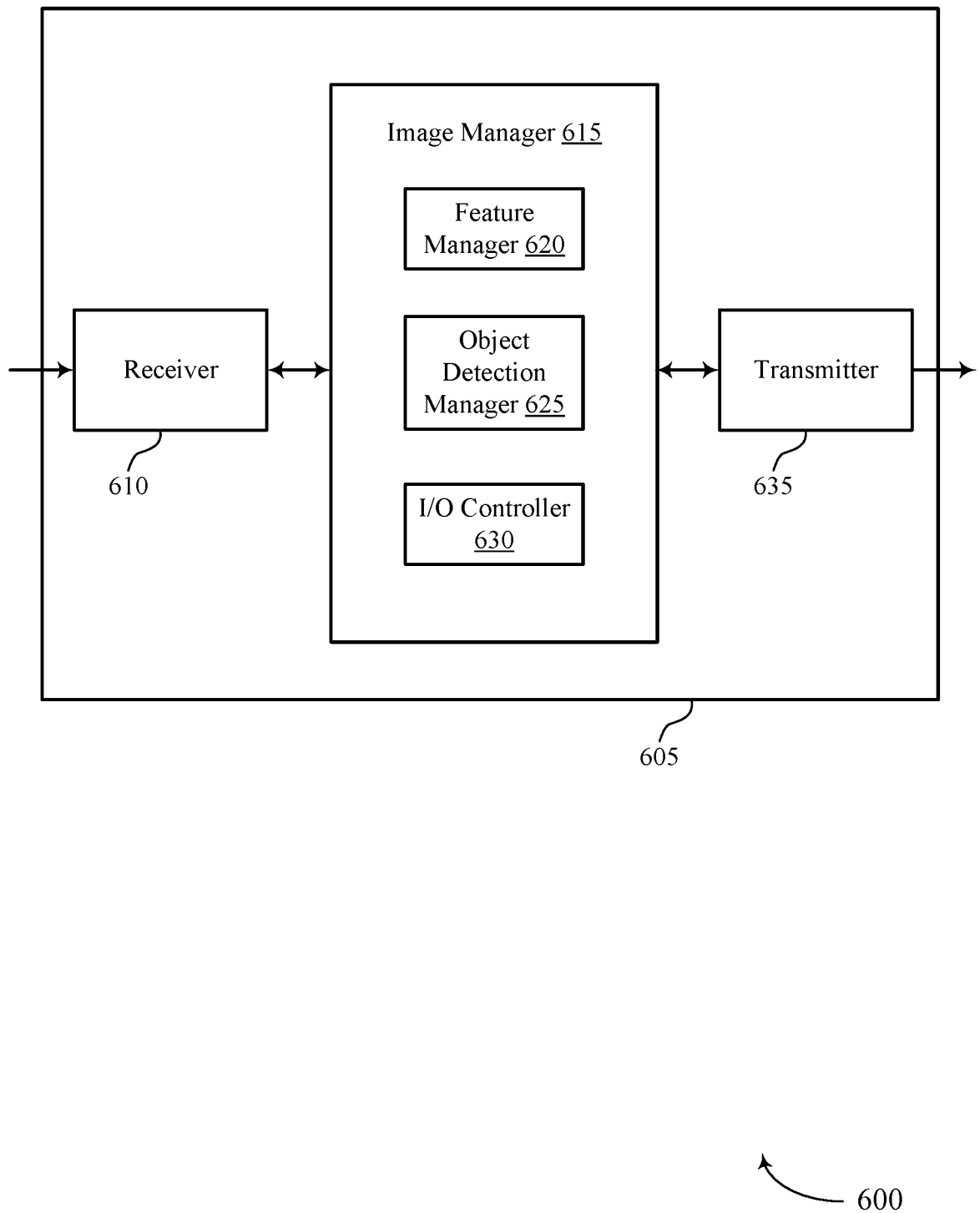
FIG. 6 shows a block diagram of a device that supports symmetry exploitation for object detection in accordance with aspects of the present disclosure.

FIG. 6 shows a block diagram 600 of a device 605 that supports symmetry exploitation for object detection in accordance with aspects of the present disclosure. The device 605 may be an example of aspects of a device 505 or a processing device as described herein. The device 605 may include a receiver 610, an image manager 615, and a transmitter 635. The device 605 may also include a processor (e.g., a graphics processor). Each of these components may be in communication with one another (e.g., via one or more buses).

Receiver 610 may receive information such as packets, user data, or control data associated with object detection. Information may be passed on to other components of the device. The receiver 610 may be an example of aspects of the transceiver 720 described with reference to FIG. 7. The receiver 610 may utilize a single antenna or a set of antennas.

The image manager 615 may be an example of aspects of the image manager 615 as described herein. The image manager 615 may include a feature manager 620, an object detection manager 625, and an I/O controller 630. The image manager 615 may be an example of aspects of the image manager 710 described herein.

The feature manager 620 may extract a plurality of features from an image and identify a set of the features corresponding to a region of the image (e.g., the features corresponding to the pixels covered by a sliding window or a subset of such features). The feature manager may select certain feature for transfer to an object model based on one or more symmetries of the object associated with the object model. For example, when the region has a height and width, the feature manager 620 may select the second feature corresponding to the second position based on the height of the region, the width of the region, or both. The feature manager 620 may transfer (e.g., to the object detection manager 625) a first feature to a first set of nodes configured to apply the classifier of the object model and transfer (e.g., to the object detection manager 625) a second feature to a second set of nodes configured to apply the classifier of the object model.

The object detection manager 625 may apply a classifier of a stored object model to the first feature of the set. The first feature may correspond to a first position of the region and a first channel of the image. The stored object model may be associated with an object category that has horizontal symmetry, vertical symmetry, or rotational symmetry. The object detection manager 625 may apply the classifier of the stored object model to a second feature of the set. The second feature may correspond to a second position of the region and a second channel of the image, and the second position and second channel may be based on the first position, first channel, and symmetry of the object category.

In some cases, applying the classifier to the first feature and applying the classifier to the second feature includes applying the classifier to the first feature and the second feature concurrently. In some cases, applying the classifier to the first feature and applying the classifier to the second feature includes applying a node of the classifier to the first feature and applying the same node to the second feature concurrently (e.g., at the same time or nearly the same time).

The I/O controller 630 may output an indication that the region of the image includes an object of the object category based on applying the classifier to the first and second features.

In some cases, the feature manager 620 may select, when the object category has horizontal symmetry, the second feature based on the column component of the second position being a width of the region minus the column component of the first position. For example, if the width of the region is W and the first feature is from position $(x_a, y_a)$, the second feature may be selected based on it being from position $(W-x_a, y_a)$. In some cases, the feature manager 620 may select, when the object category has horizontal symmetry, the second feature based on the second channel's angle being a result of the first channel's angle subtracted from a predetermined plurality of degrees. For example, if the first feature is from channel 2 (which, e.g., corresponds to 30°), then the second feature may be selected based on its channel being channel 6 (which corresponds to 150° (i.e., 180°–30°).

In some cases, the feature manager 620 may select, when the object category has vertical symmetry, the second feature based on the row component of the second position being a height of the region minus the row component of the first position. For example, if the height of the region is H and the first feature is from position $(x_a, y_a)$, the second feature may be selected based on it being from position $(x_a, H-y_a)$.

In some cases, the feature manager 620 may select, when the object category has rotational symmetry, the second feature based on the second channel's angle being the first channel's angle plus a predetermined plurality of degrees. For example, when the predetermined plurality of degrees is 30° and the first channel's angle is 60° (e.g., when the first channel is channel 3), the second feature may be selected based on its channel being 90° (e.g., channel 4). The first channel may be a gradient histogram channel corresponding to a first direction and the second channel may be a gradient histogram channel corresponding to a second direction.

Transmitter 635 may transmit signals generated by other components of the device. In some examples, the transmitter 635 may be collocated with a receiver 610 in a transceiver module. For example, the transmitter 635 may be an example of aspects of the transceiver 720 described with reference to FIG. 7. The transmitter 635 may utilize a single antenna or a set of antennas.

Figure 7:
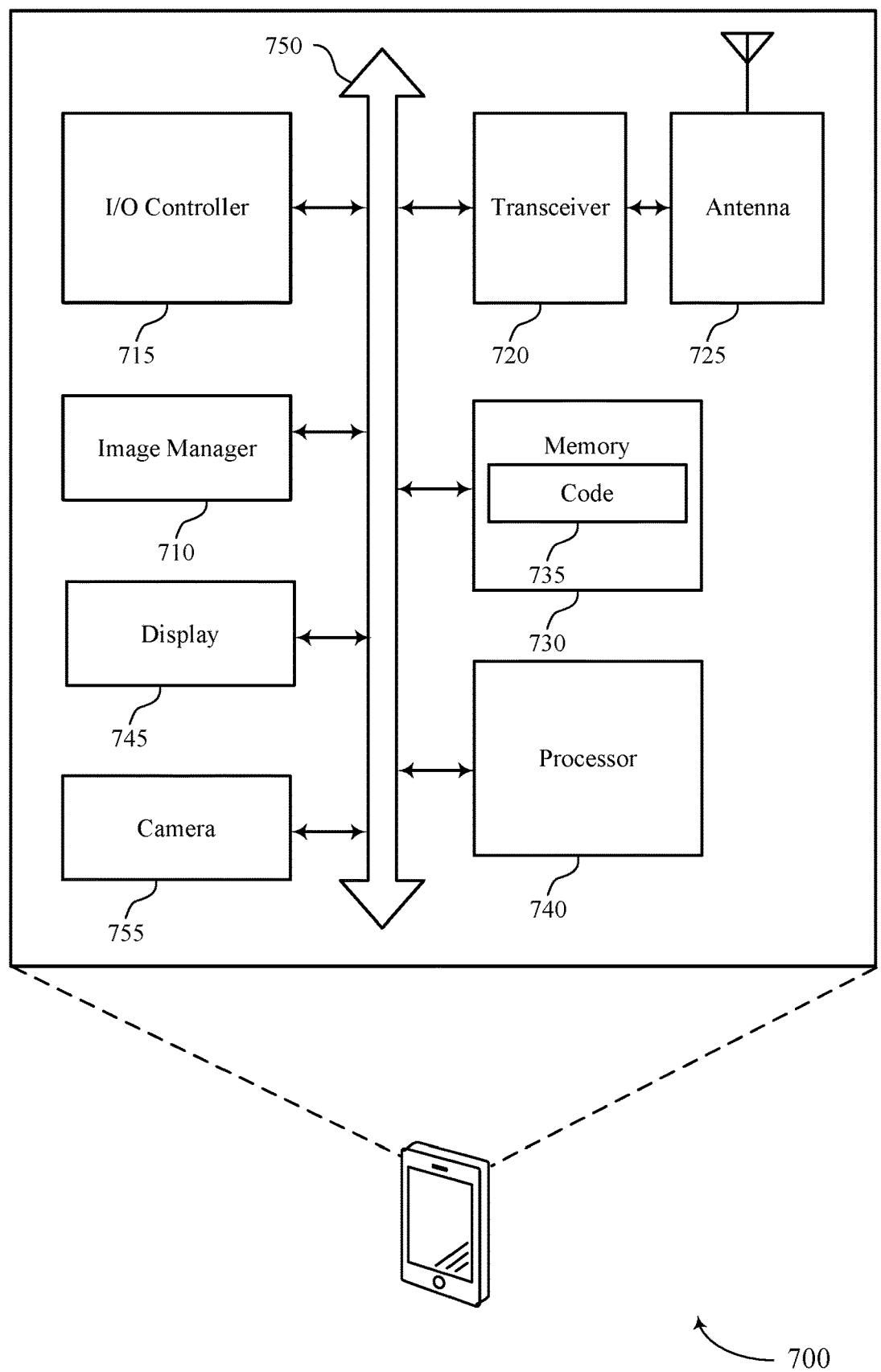
FIG. 7 shows a diagram of a device that supports symmetry exploitation for object detection in accordance with aspects of the present disclosure.

FIG. 7 shows a diagram of a device 700 that supports symmetry exploitation for object detection in accordance with aspects of the present disclosure. The device 700 may include components for bi-directional voice and data communications including components for transmitting and receiving communications, including an image manager 710, an I/O controller 715, a transceiver 720, an antenna 725, memory 730, a processor 740, a display 745, and a camera 755. These components may be in electronic communication via one or more buses (e.g., bus 750).

The image manager 710 may be configured to perform the object detection techniques described herein. For example, the image manager 710 may be configured to extract a plurality of features from an image; identify a set of the features corresponding to a region of the image; apply a classifier of a stored object model to a first feature of the set corresponding to a first position of the region and a first channel of the image, where the stored object model is associated with an object category that has horizontal symmetry, vertical symmetry, or rotational symmetry; apply the classifier of the stored object model to a second feature of the set corresponding to a second position of the region and a second channel of the image, the second position and second channel based on the first position, first channel, and symmetry of the object category; and output an indication that the region of the image includes an object of the object category based on applying the classifier to the first and second features.

The display 745 may be configured to display digital images or videos captured or received by the device 700 (e.g., captured by the camera 755 or received from another device). The display 745 may also be configured to (e.g., in response to a prompt by the image manager 710) indicate the presence and/or location of an object detected within an image. For example, the display 745 may output one or more visual representations overlaid on the image.

The I/O controller 715 may manage input and output signals for the device 700. The I/O controller 715 may also manage peripherals not integrated into the device 700. In some cases, the I/O controller 715 may represent a physical connection or port to an external peripheral. For example, I/O controller 715 may connect and manage one or more displays (e.g., display device 745). In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 700 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the device 700 may include a single antenna 725. However, in some cases the device 700 may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various object detection functions described herein. In some cases, the memory 730 may contain, among other things, a BIOS which may control basic hardware or software operation such as the interaction with peripheral components or devices.

The code 735 may include instructions to implement aspects of the present disclosure, including instructions to support object detection using symmetry exploitation and a reduced object model set. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

The processor 740 may include an intelligent hardware device, (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 700 to perform various functions (e.g., functions or tasks supporting various object detection techniques). In some cases, the image manager 710 may be part of the processor 740.

As detailed above, image manager 710 and/or one or more components of the image manager 710 may perform and/or be a means for performing, either alone or in combination with other elements, one or more operations for detecting objects by exploiting their symmetries and using a reduced object model set.

Figure 8:
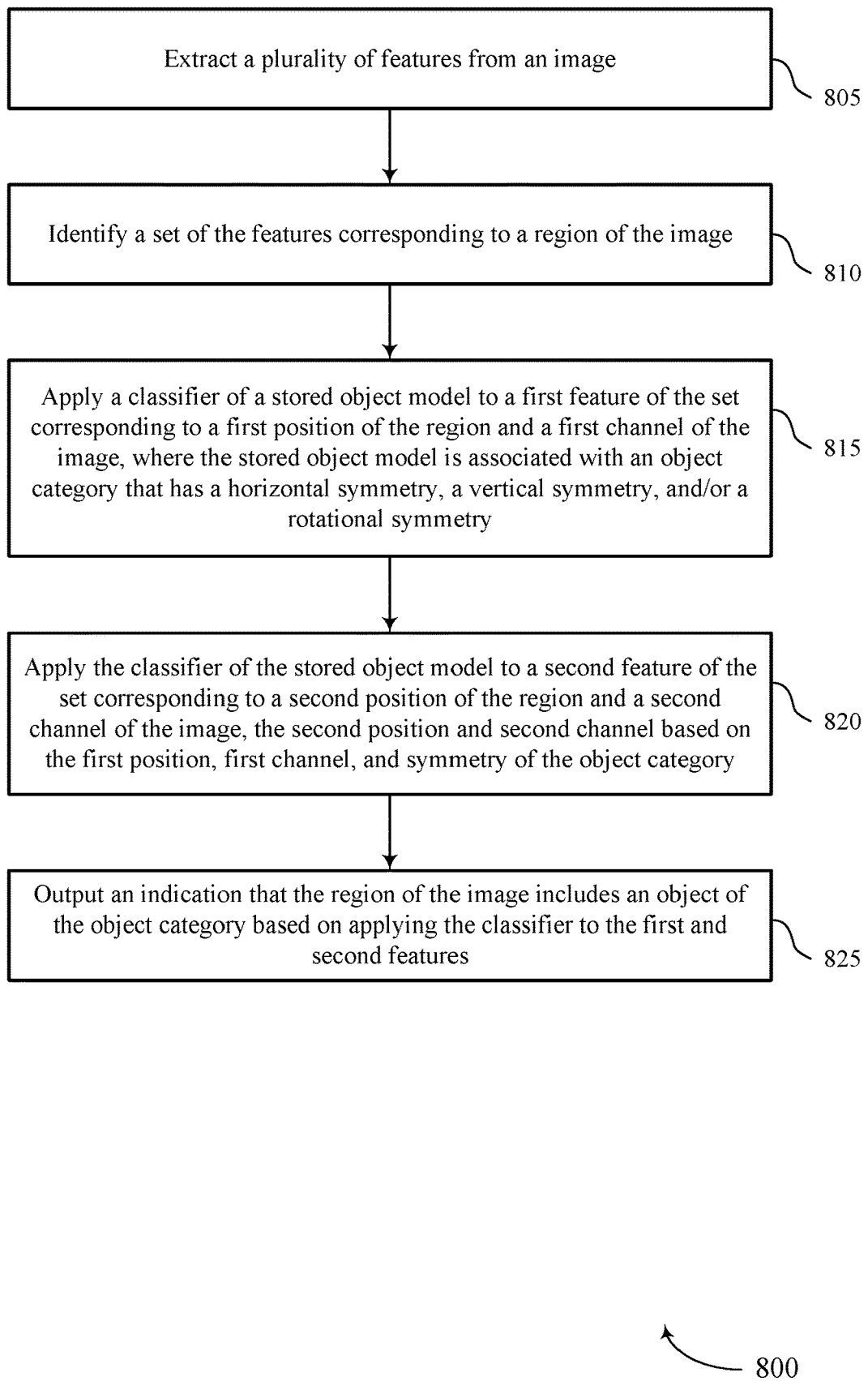
FIG. 8 shows a flowchart illustrating a method that supports symmetry exploitation for object detection in accordance with aspects of the present disclosure.

FIG. 8 shows a flowchart illustrating a method 800 that supports symmetry exploitation for object detection in accordance with aspects of the present disclosure. The operations of method 800 may be implemented by a device or its components as described herein. The operations of method 800 may be performed by an image manager as described with reference to FIGS. 5 through 7. In some examples, a device may execute a set of instructions to control the functional elements of the device to perform the functions described below. Additionally or alternatively, a device may perform aspects of the functions described below using special-purpose hardware. In some cases, the device may include a camera configured to capture an image and display device in electronic communication with the camera and configured to display the image. In such cases, the device may include a graphics processor configured to perform the operations of method 800.

At 805, the method may include extracting a plurality of features from an image. The operations of 805 may be performed according to the methods described herein. In certain examples, aspects of the operations of 805 may be performed by a feature manager as described with reference to FIG. 6.

At 810, the method may include identifying a set of the features corresponding to a region of the image. The operations of 810 may be performed according to the methods described herein. In certain examples, aspects of the operations of 810 may be performed by a feature manager as described with reference to FIG. 6.

At 815, the method may include applying a classifier of a stored object model to a first feature of the set corresponding to a first position of the region and a first channel of the image. The stored object model may be associated with an object category that has a horizontal symmetry, a vertical symmetry, and/or a rotational symmetry. The operations of 815 may be performed according to the methods described herein. In certain examples, aspects of the operations of 815 may be performed by a feature manager as described with reference to FIG. 6.

At 820, the method may include applying the classifier of the stored object model to a second feature of the set corresponding to a second position of the region and a second channel of the image, the second position and second channel based on the first position, first channel, and symmetry of the object category. The operations of 820 may be performed according to the methods described herein. In certain examples, aspects of the operations of 820 may be performed by the object detection manager as described with reference to FIG. 6.

At 825, the method may include outputting an indication that the region of the image includes an object of the object category based on applying the classifier to the first and second features. The operations of 825 may be performed according to the methods described herein. In certain examples, aspects of the operations of 825 may be performed by an I/O controller as described with reference to FIG. 6.

It should be noted that the methods described above describe possible implementations, and that the operations and the steps may be rearranged or otherwise modified and that other implementations are possible. Further, aspects from two or more of the methods may be combined. In some cases, one or more operations described above may be omitted or adjusted without deviating from the scope of the present disclosure. Thus the methods described above are included for the sake of illustration and explanation and are not limiting of scope.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, EEPROM, flash memory, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for object detection, comprising:
   extracting a plurality of features from an image;
   identifying a set of the features corresponding to a region of the image;
   applying a classifier of a stored object model to a first feature of the set corresponding to a first position within the region and a first channel of the image, wherein the stored object model is associated with an object category that has a symmetry comprising one or more of: a horizontal symmetry, a vertical symmetry, or a rotational symmetry;
   applying the classifier of the stored object model to a second feature of the set corresponding to a second position within the region and a second channel of the image, the second position and second channel based on the first position, first channel, and symmetry of the object category, wherein the second feature is selected by one or more of:
      selecting, when the object category has horizontal symmetry and the first position and the second position each comprise a column component, the second feature based on the column component of the second position being a width of the region minus the column component of the first position,
      selecting, when the object category has vertical symmetry and the first position and second position each comprise a row component, the second feature based on the row component of the second position being a height of the region minus the row component of the first position,
      selecting, when the object category has horizontal symmetry and the first channel corresponds to a first angle and the second channel corresponds to a second angle, the second feature based on the second angle being a result of the first angle subtracted from a predetermined plurality of degrees, or
      selecting, when the object category has rotational symmetry and first channel corresponds to a first angle and the second channel corresponds to a second angle, the second feature based on the second angle being the first angle plus a predetermined plurality of degrees; and
   outputting an indication that the region of the image includes an object of the object category based on applying the classifier to the first and second features.

2. The method of claim 1, wherein the region has a height and a width, the method further comprising:
   selecting the second feature corresponding to the second position based on the height of the region, the width of the region, or both.

3. The method of claim 1, wherein applying the classifier to the first feature and applying the classifier to the second feature comprises:
   applying the classifier to the first feature and the second feature concurrently.

4. The method of claim 1, wherein applying the classifier to the first feature and applying the classifier to the second feature comprises:
   comparing the first feature to a first threshold; and
   comparing the second feature to the first threshold.

5. The method of claim 4, further comprising:
   determining whether to compare a third feature to a second threshold or a fourth feature to a third threshold based on comparing the first feature to the first threshold; and
   determining whether to compare a fifth feature to the second threshold or a sixth feature to the third threshold based on comparing the second feature to the first threshold.

6. The method of claim 1, wherein the first channel is a gradient histogram channel corresponding to a first direction and the second channel is a gradient histogram channel corresponding to a second direction.

7. An apparatus for object detection, comprising:
a processor;
memory in electronic communication with the processor; and
instructions stored in the memory and executable by the processor to cause the apparatus to:
  extract a plurality of features from an image;
  identify a set of the features corresponding to a region of the image;
  apply a classifier of a stored object model to a first feature of the set corresponding to a first position within the region and a first channel of the image, wherein the stored object model is associated with an object category that has a symmetry comprising one or more of: a horizontal symmetry, a vertical symmetry, or a rotational symmetry;
  apply the classifier of the stored object model to a second feature of the set corresponding to a second position within the region and a second channel of the image, the second position and second channel based on the first position, first channel, and symmetry of the object category, wherein the second feature is selected by one or more of:
    selecting, when the object category has horizontal symmetry and the first position and the second position each comprise a column component, the second feature based on the column component of the second position being a width of the region minus the column component of the first position,
    selecting, when the object category has vertical symmetry and the first position and second position each comprise a row component, the second feature based on the row component of the second position being a height of the region minus the row component of the first position,
    selecting, when the object category has horizontal symmetry and the first channel corresponds to a first angle and the second channel corresponds to a second angle, the second feature based on the second angle being a result of the first angle subtracted from a predetermined plurality of degrees, or
    selecting, when the object category has rotational symmetry and first channel corresponds to a first angle and the second channel corresponds to a second angle, the second feature based on the second angle being the first angle plus a predetermined plurality of degrees; and
  output an indication that the region of the image includes an object of the object category based on applying the classifier to the first and second features.

8. The apparatus of claim 7, wherein the region has a height and a width, and wherein the instructions are further executable by the processor to cause the apparatus to:
  select the second feature corresponding to the second position based on the height of the region, the width of the region, or both.

9. The apparatus of claim 7, wherein the instructions executable to cause the apparatus to apply the classifier to the first feature and apply the classifier to the second feature further comprise instructions executable to cause the apparatus to:
  apply the classifier to the first feature and the second feature concurrently.

10. The apparatus of claim 7, wherein the instructions executable to cause the apparatus to apply the classifier to the first feature and apply the classifier to the second feature further comprise instruction executable to cause the apparatus to:
  compare the first feature to a first threshold;
  compare the second feature to the first threshold
  determine whether to compare a third feature to a second threshold or a fourth feature to a third threshold based on comparing the first feature to the first threshold; and
  determine whether to compare a fifth feature to the second threshold or a sixth feature to the third threshold based on comparing the second feature to the first threshold.

11. The apparatus of claim 7, wherein the first channel is a gradient histogram channel corresponding to a first direction and the second channel is a gradient histogram channel corresponding to a second direction.

12. A device, comprising:
a camera configured to capture an image;
a display device in electronic communication with the camera and configured to display the image; and
a graphics processor in electronic communication with the camera and the display device, the graphics processor configured to:
  extract a plurality of features from the image;
  identify a set of the features corresponding to a region of the image;
  apply a classifier of a stored object model to a first feature of the set corresponding to a first position within the region and a first channel of the image, wherein the stored object model is associated with an object category that has a symmetry comprising one or more of: a horizontal symmetry, a vertical symmetry, or a rotational symmetry;
  apply the classifier of the stored object model to a second feature of the set corresponding to a second position within the region and a second channel of the image, the second position and second channel based on the first position, first channel, and symmetry of the object category, wherein the second feature is selected by one or more of:
    selecting, when the object category has horizontal symmetry and the first position and the second position each comprise a column component, the second feature based on the column component of the second position being a width of the region minus the column component of the first position,
    selecting, when the object category has vertical symmetry and the first position and second position each comprise a row component, the second feature based on the row component of the second position being a height of the region minus the row component of the first position,
    selecting, when the object category has horizontal symmetry and the first channel corresponds to a first angle and the second channel corresponds to a second angle, the second feature based on the second angle being a result of the first angle subtracted from a predetermined plurality of degrees, or
    selecting, when the object category has rotational symmetry and first channel corresponds to a first angle and the second channel corresponds to a second angle, the second feature based on the second angle being the first angle plus a predetermined plurality of degrees; and output to the display device an indication that the region of the image includes an object of the object category based on applying the classifier to the first and second features.

\* \* \* \* \*